Jan. 2, 1934. W. B. THOMPSON 1,942,379
FLUID CURRENT CONVEYER
Original Filed April 14, 1930  3 Sheets-Sheet 1
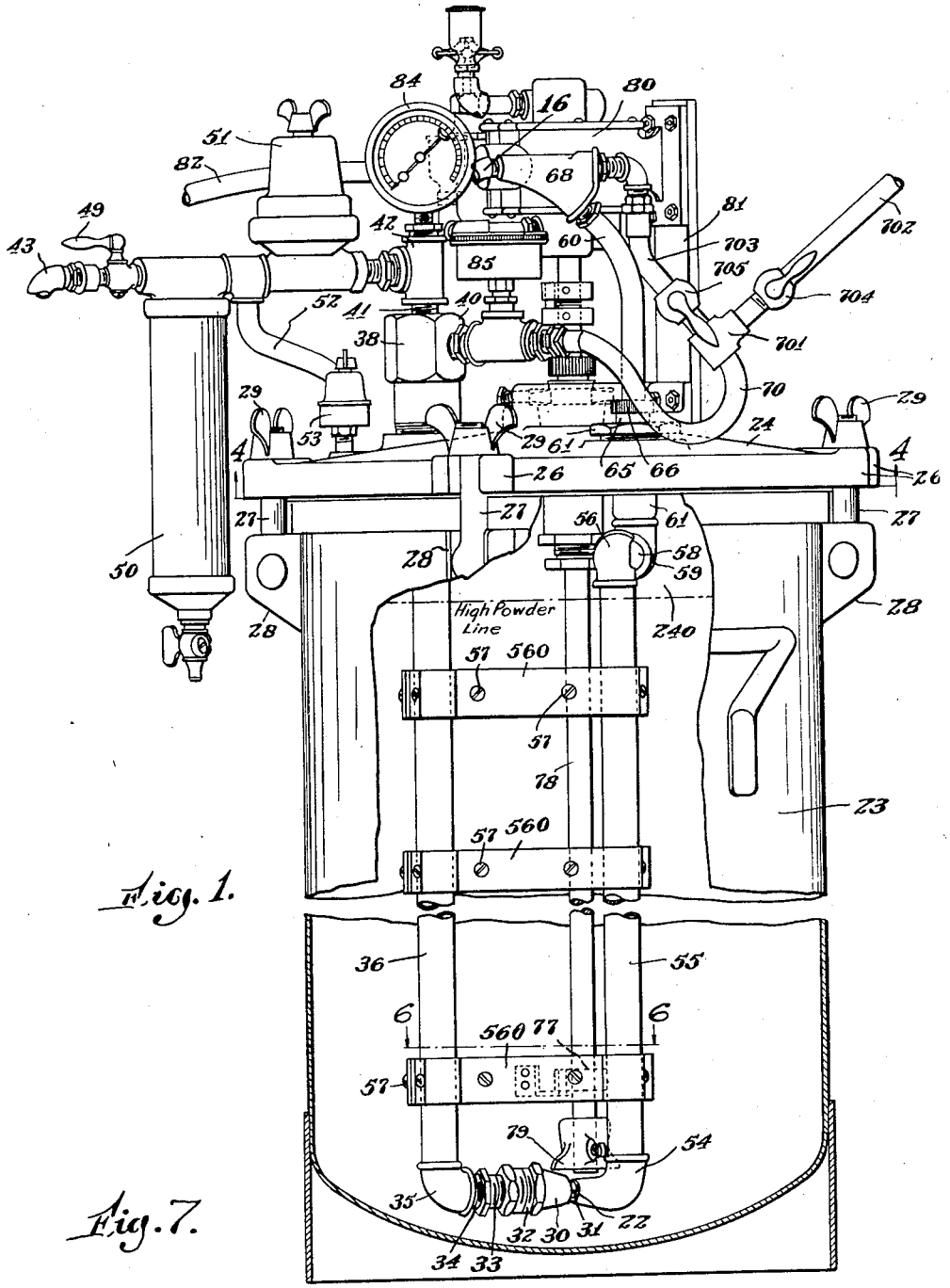
Fig. 1.
Fig. 7.
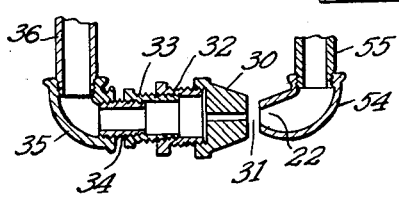
Inventor
Wayne B. Thompson
by Charles W. McDermott
his Attorney Jan. 2, 1934.   W. B. THOMPSON   1,942,379
FLUID CURRENT CONVEYER
Original Filed April 14, 1930   3 Sheets-Sheet 2
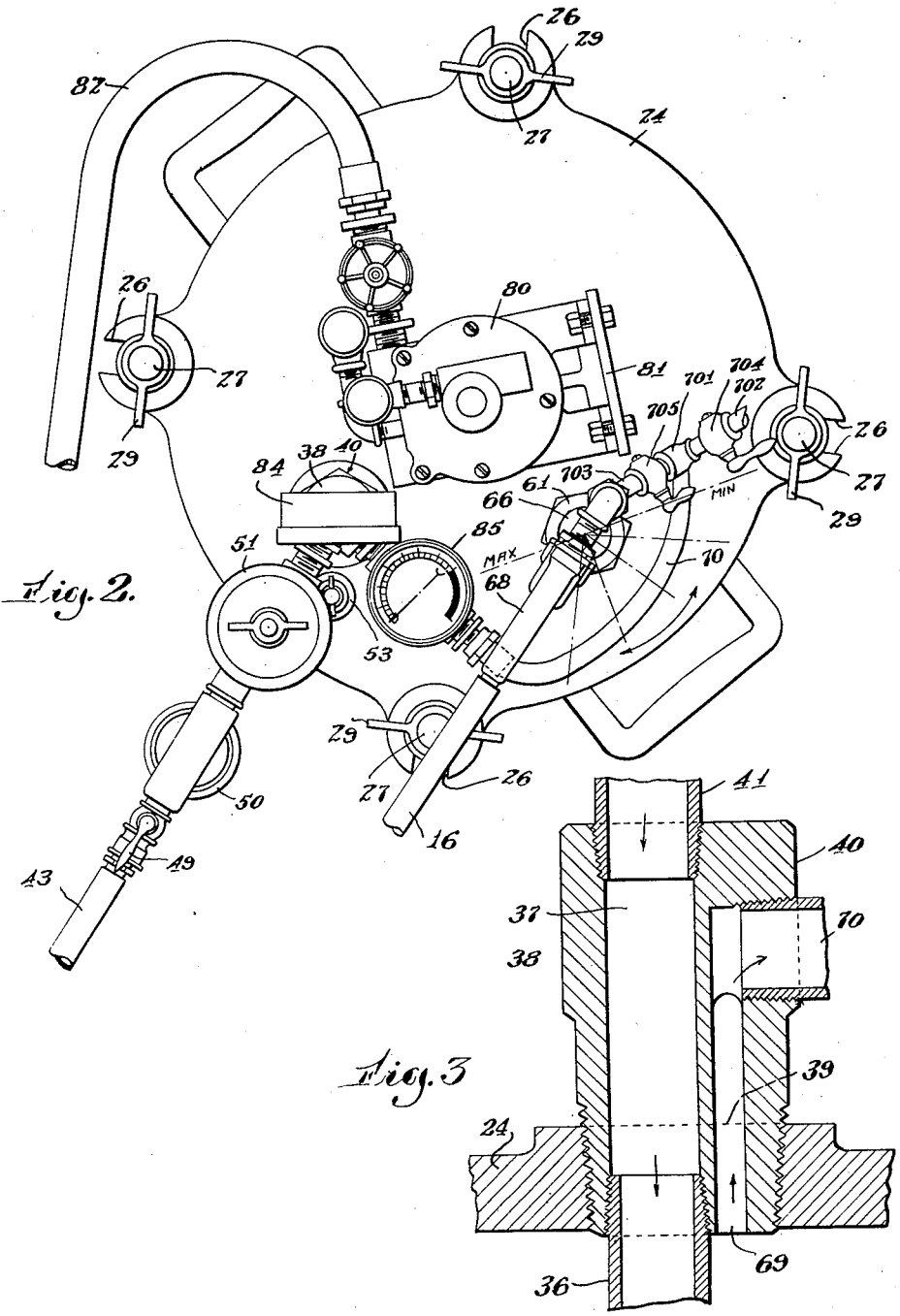

Jan. 2, 1934.  W. B. THOMPSON  1,942,379
FLUID CURRENT CONVEYER
Original Filed April 14, 1930  3 Sheets-Sheet 3
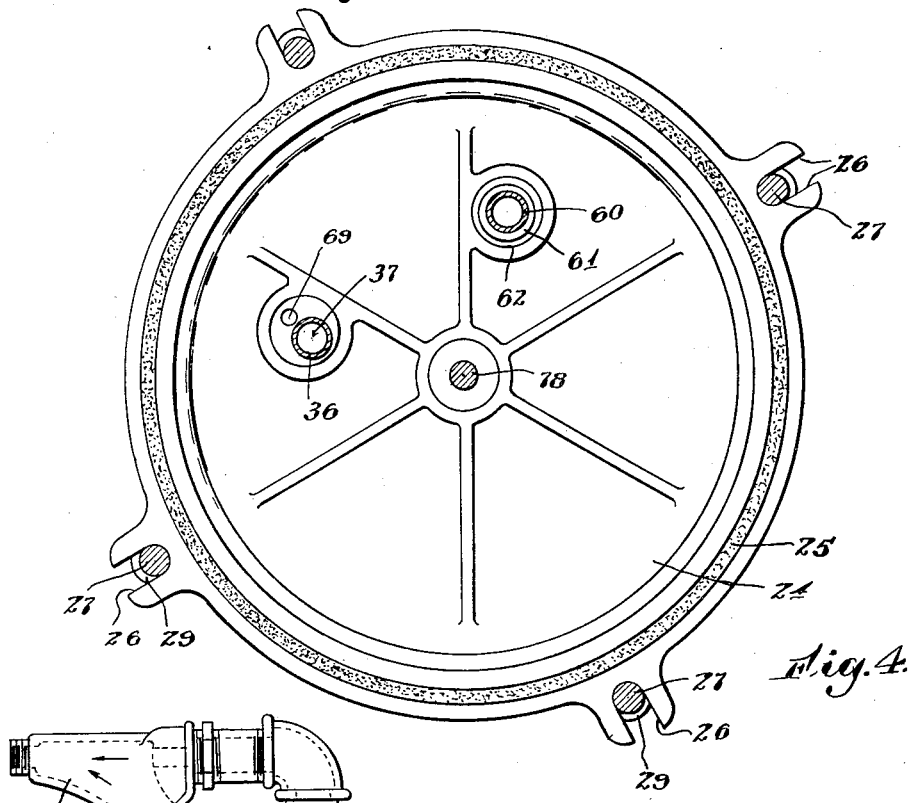
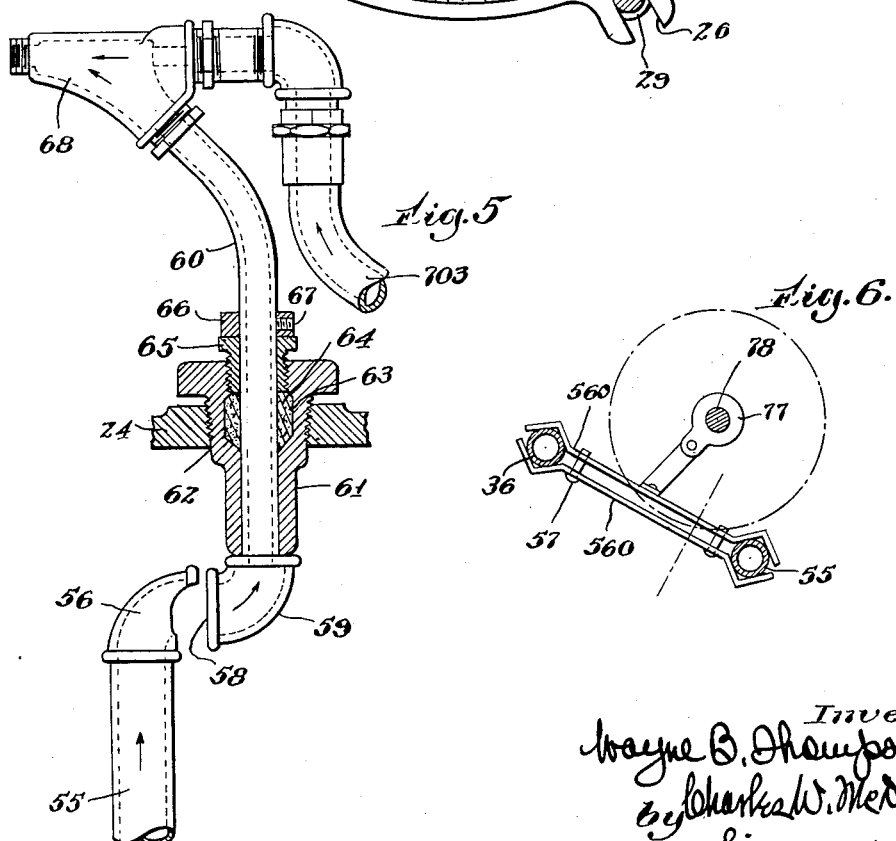

Patented Jan. 2, 1934

1,942,379

UNITED STATES PATENT OFFICE 1,942,379

FLUID CURRENT CONVEYER

Wayne B. Thompson, Winchester, Mass., assignor to Spraco, Inc., Somerville, Mass., a corporation of Massachusetts Application April 14, 1930, Serial No. 444,084
Renewed April 29, 1933

9 Claims. (Cl. 302—53)

The present invention relates to fluid current conveyers which are used in many industrial arts to convey solid materials from a source of supply to a point of discharge or use.

In the manufacture of rubber goods it is customary to coat the freshly formed rubber surfaces with powder, such as soapstone or stearate of zinc, before vulcanization, in order to prevent the surfaces from adhering together while being handled. Rubber tubes, such for instance, as tubes for automobile tires, are extruded. Immediately upon leaving the extruding machine the tube rests flatwise upon a mechanical conveyer so that the continuous tube may be conveyed to an operating station at which the tube is cut up into individual lengths suitable for use as a tire-tube. In order to prevent the interior surface of the tube from sticking together as the tube rests flatwise upon the conveyer it has been proposed heretofore to provide the extruding mandrel with means for coating the interior of the tube with powder. The motive agent for discharging the powder against the interior surfaces of the extruded tube is air. Heretofore, no way has been found to coat the interior surfaces of the extruded tube with powder without an excessive use of air. Excess air produces abnormalities in the extruded tube by blowing it up while being conveyed to the cutting-off station. At this station the cutting-off operation momentarily seals the tube causing the excess air first to blow up the tube, and then, when the seal is broken, to blow powder out of the open end of the tube to the great annoyance of those working at or near the cutting-off station.

The principal object of the present invention is to produce a fluid current conveyer which will conduct solid material from a source of supply and discharge it at a point of use unaccompanied by an excessive amount of fluid current, thus to solve many difficult problems in many industrial arts, particularly those arising heretofore in the extrusion of rubber tubes.

To the accomplishment of this object, and such others as may hereinafter appear, the various features of the present invention relate to certain devices, combinations and arrangements of parts, hereinafter described and then set forth broadly and in detail in the appended claims, possessing advantages readily apparent to those skilled in the art.

The various features of the present invention will be readily understood from an inspection of the accompanying drawings, in which, Figure 1 is an enlarged view in elevation of the pressure chamber, partly broken away to show the interior parts;

Fig. 2 is a view in plan of the pressure chamber;

Fig. 3 is a detail view in sectional elevation of the fluid current inlet to the pressure chamber and the vent therefor;

Fig. 4 is a view in underside sectional plan, on the line 4—4, Fig. 1;

Fig. 5 is a detail view in sectional elevation of a part of the unbalanced pressure portion of the discharge conduit showing its position with relation to the outlet of the balanced pressure portion of the discharge conduit;

Fig. 6 is a view in sectional plan on the line 6—6, Fig. 1, and

Fig. 7 is a detail view in sectional elevation showing the means for spacing the nozzle of the fluid current conduit from the inlet of the discharge conduit.

For the purposes of disclosure only, the apparatus to which the solid material is conveyed by the fluid current conveyer embodying the features of the present invention, is a machine for extruding rubber tubes. Generally, such a machine is provided with an extruding screw by means of which rubber from a suitable batch is extruded through a spider about a cylindrical mandrel to form a continuous tube. The continuous tube, as fast as it is formed, is conveyed away from the machine by a mechanical conveyer. In order to coat the interior of the tube with powder to prevent the internal surfaces of the tube from sticking together when the tube collapses out of cylindrical form as it rests flatwise on the conveyer, the spider is connected to a flexible conduit from which the powder is discharged into a passage in the spider. This passage communicates with another passage formed through the mandrel and a discharge nozzle formed on the free end face of the mandrel. Powder is discharged laterally from the nozzle through a series of radial orifices arranged therein.

In the illustrated embodiment of the present invention the discharge conduit 16 is provided (Figs. 1 and 7) with an intake 22 located within a tank or chamber 23 adjacent the bottom thereof. The chamber 23 is partially filled with powder, such as stearate of zinc, soapstone or other powdered material used in the rubber industry to prevent the adherence of sticky rubber surfaces.

After the chamber 23 is partially filled with powder its open top is covered by a cover 24 (Figs.

1, 2 and 4), thus to leave a space 240 in the chamber above the body portion of the powder. The interior of the cover 24 is provided with a gasket 25 (Fig. 4) to engage the circular top edge of the chamber 23 and form an air tight joint. The cover 24 is provided with a series of peripheral slots 26 each of which receives the shank of a bolt 27 which is pivoted between a pair of small plates 28 supported by the exterior surface of the chamber 23. The free end of the bolt 27 is screw-threaded and receives a wing-nut 29 adapted to engage the upper surface of the cover 24 (Fig. 1).

The powder in the chamber 23 is caused to enter the intake 22 by an air-jet which issues from a nozzle 30, (Figs. 1 and 7). The intake 22 and the nozzle 30 are buried in the powder and are otherwise arranged to form a gap 31 (Fig. 7) between their orifices. The nozzle 30 is threaded on a coupling 32 which is fitted on a second coupling 33. The coupling 33 is fitted on a nipple 34 fitted in turn to an elbow 35. With this construction the width of the gap 31 may be varied as desired. The elbow 35 is carried by the lower end of a vertical pipe 36 the upper end of which is screw-threaded into a passage 37, (Fig. 3). The passage 37 is formed in a head 38 (Figs. 1, 2 and 3) one end of which is screw-threaded to fit into an opening 39 (Fig. 3) formed through the cover 24. The other end of the head 38 is provided with a wrench-engaging surface 40, (Fig. 1).

Communicating with the upper end of the passage 37 is a nipple 41 (Figs. 1 and 3) connected to a T 42 secured to one end of an air conduit 43 (Fig. 2) forming a branch from the main air line. Air entering the conduit 43 from the main line may first pass through an oil and water separator (not shown) preferably of the type illustrated and described in my pending application filed July 12, 1929, Serial No. 377,668. Located in the branch 43 is a shut-off-cock 49, an oil and water separator 50, and an automatic pressure reducing valve 51. After the air flows through the valve 51 it passes, under reduced pressure, down through the pipe 36 and out of the nozzle 30 into the chamber 23.

As the jet of air issuing from the nozzle 30 has a small diameter and as the orifice in the intake 22 is comparatively large, the jet of air, in addition to driving by impact some of the powder in the gap 31 into the intake 22, produces a suctional effect within the intake to induce powder out of contact with the jet to flow into the intake or be brought within the sphere of influence of the jet. The powder which is driven and which flows into the intake 22 is commingled with the air current and is carried thereby in an atomized condition upwardly into the discharge conduit 16.

In addition to causing the powder in the chamber to enter the intake 22 and entraining the atomized powder in the lower portion of the discharge conduit 16, the air jet from the nozzle 30 builds up pressure within the chamber 23. In order to build up a pressure in the chamber quickly and thus prevent sluggishness in the initial use or the restarting of the fluid current conveyer, the branch air conduit 43 is connected to the space 240 in the chamber 23 by a by-pass line 52 (Fig. 1) provided with an automatic pressure reducing valve 53. This valve 53 is set to deliver air under reduced pressure to the space 240. As soon as the pressure in the space 240 reaches the pressure at which the valve 53 is set, it automatically closes and thereafter all the air delivered to the chamber 23 passes through the nozzle 30.

It will be apparent to those skilled in the art that if the discharge conduit 16 extended in a closed condition continuously from the intake 22 to an outlet outside the chamber 23 a condition of unbalanced pressure would exist between the inlet and the outlet of the conduit. In consequence the powder would enter the intake 22 and be entrained in an atomized condition in the conduit 16 under the combined action of the pressure in the chamber 23 and the velocity of the air-jet produced by the difference in the pressure of the air in the pipe 36 and atmospheric pressure at the discharge orifices in the mandrel of the rubber extruding machine. This method of conducting the powder from the chamber 23 to the orifices of the extruding machine would result in a discharge of excess air and powder therefrom.

In order to reduce the amount of air and powder discharged at said orifices the transfer of the powder from the chamber 23 is conducted in two stages, in one of which the powder is caused to enter the intake 22 and be entrained in the lower portion of the conduit under the velocity of the jet produced by the difference in pressure in the pipe 36 and the pressure in the space 240, and in the other one of which the powder is moved in the conduit 16 by air under the pressure existing in the space 240. As an illustration, if the air issuing from the nozzle 30 is under a pressure of fifteen pounds the pressure in the space 240 may have a pressure of two pounds, the difference being caused by loss of air through the outlets to be described. The air issuing from the nozzle 30 tends to neutralize the thirteen pound difference between the pressure in the pipe 36 and the pressure of the air in the space 240 by rushing into said space thus imparting velocity to the air jet.

In order that this velocity of the air-jet, independent of pressure, may be utilized to cause the powder to enter the intake 22, the discharge conduit 16, within the chamber 23, communicates with the space 240 above the powder in the chamber. The means of communication between the discharge conduit 16 and the space 240 may be openings formed in the discharge conduit 16. It is preferred, however, to divide the discharge conduit within the chamber 23 into two parts so that some of the powder may be circulated repeatedly from a deep part of the body portion thereof in the chamber to the surface of the powder by way of the space 240.

To this end the intake 22 is formed in an elbow 54 which is connected to the lower end of a vertical pipe 55 the upper end of which is provided with an elbow 56 (Figs. 1 and 5) arranged to discharge the atomized powder laterally therefrom into the space 240. The pipe 55 is supported in a fixed vertical position by a series of hangers 560 (Figs. 1 and 6) having angular ends which are caused by screws 57 to grip the exterior of the pipes 36 and 55, respectively.

By causing the pipe 55 to discharge into the space 240 the discharge conduit 16 is provided with a balanced pressure portion extending from a deep part of the material in the chamber to the space 240. As the pressure on the pipe 55, the intake 22 and the discharge elbow 56 is balanced because these parts are located within the chamber 23, reliance is placed entirely upon the velocity of the jet issuing from the nozzle 30 to cause the powder to enter the intake 22 and to entrain the powder in an atomized condition through the pipe 55 and out of the elbow 56. As the atomized powder discharges laterally into the space 240 the powder settles and drops by gravity back into the body portion thereof instead of into the pipe 55. In order to collect some of the powder discharged laterally into the space 240, the other part of the discharge conduit within the chamber 23 is provided with an intake 58 (Figs. 1 and 5) formed in an elbow 59 secured to the bottom of a vertical pipe 60. The pipe 60 passes through a bushing 61 having external screw-threads which fit threads formed in an opening 62 in the cover 24. The bushing 61 is provided with a cavity 63 filled with packing 64 which is held in place by a gland nut 65 threaded into the cavity 63. In order to hold the horizontal flange on the elbow 59 against the bushing 61 to maintain the orifice 58 in a definite position, the gland nut 65 is engaged by a collar 66 which is secured to the pipe 60 by a set-screw 67. When the gland nut 65 is screwed further into the cavity 63 to take up wear on the packing 64 the position of the collar 66 on the pipe 60 is changed to maintain it engaged with the upper face of the gland nut 65.

As shown in Fig. 5 the sides of the elbow 56, adjacent the discharge orifice thereof, are cut away to permit the atomized powder to shoot out into the space 240 in a fan formation. Most of the atomized powder in this fan settles down upon the surface of the material in the chamber 23. Some of the atomized powder shoots across the space between the elbows 56 and 59 and collects inside the orifice 58.

As the orifice 58 is located within the space 240, which is filled with air under pressure, the pressure in the portion of the discharge conduit 16, extending from within the space 240 to its point of connection with the orifices in the mandrel of the rubber extruding machine, is unbalanced. That is, the intake 58 is subjected to the air under pressure in the space 240 while the outlet of the discharge conduit 16 is, substantially, under atmospheric pressure. Therefore within the chamber 23 the discharge conduit 16 has a balanced pressure portion, through which the powder is conducted by the velocity of the air jet from a deep part of the body portion thereof to the space 240, and an unbalanced pressure portion through which the atomized powder which collects in the elbow 59 is conducted by the air under pressure in the space 240, out of the chamber 23.

Thus the powder collected in the elbow 59 is elevated by the air under pressure in the space 240 up the pipe 60 and into and out of a nozzle 68 carried by the discharge conduit 16. With this construction and mode of operation the volume of powder within the pipe 60 limits the volume of air passing out of the space 240 through the pipe 60 so that more air by volume enters the chamber 23 through the nozzle 30 than exits from the chamber 23 through the pipe 60. This excess of entering air, if not controlled, would tend to build up the pressure in the chamber 23, thus reducing the difference between the pressure of the air in the pipe 36 and the pressure of the air in the space 240 and thereby cutting down the velocity of the air-jet. In fact, if the discharge conduit outside the chamber 23 became clogged the excess of entering air, if not controlled, would tend to build up a pressure in the chamber 23 equal to the pressure at which the automatic pressure reducing valve 51 is set to deliver air to the chamber 23. If this happened the pressure reducing valve 51 would automatically close, thus shutting off the air supplied to the nozzle 30 and stopping the operation of the fluid current conveyer.

In order to prevent this from happening the space 240 is vented by a passage or vent 69 (Figs. 3 and 4) formed in the head 38. The velocity of the air-jet entrains the powder through the balanced pressure portion of the conduit 16 and shoots the powder out of the orifice in the elbow 56 into the space 240 in an atomized condition. The space 240 is filled, therefore, with a tenuous cloud of powder so that the air flowing out through the vent 69 is commingled with a small quantity of powder.

To prevent the vented air commingled with powder from fouling the atmosphere by being discharged directly into the room where the chamber 23 is located, the passage 69 communicates with one end of a flexible pipe 70 (Figs. 1, 2, and 3) threaded into the wrench-engaging surface 40. The other end of the flexible pipe 70 is suitably connected to a T 701 from which all the vented air may be conducted to the atmosphere through a pipe 702. All the vented air, however, may be conducted into the nozzle 68 by a pipe 703 which is suitably connected to the nozzle 68 (Figs. 1 and 5). However, by manipulation of the shut-off cocks 704 and 705, located respectively in the pipes 702 and 703, the vented air may be divided in any desired proportions and conducted both to the atmosphere and to the nozzle 68.

The air passing out of the chamber 23 through the passage or vent 69 and pipe 70 vents the chamber 23 and also acts, when led to the nozzle 68, to boost along the powder which has been delivered by the pipe 60 through the nozzle 68 of the discharge conduit 16. The air under pressure in the space 240 is sufficient to elevate the atomized powder up the pipe 60, through the nozzle 68 and into the portion of the discharge conduit 16 extending beyond the nozzle 68. The air from the pipe 703 acts upon the powder in the portion of the discharge conduit 16 beyond the nozzle 68 to cause it to flow uniformly therein and clear the way for more powder to be brought from the pipe 60 and nozzle 68 into the portion of the discharge conduit 16 beyond said nozzle. With this construction and mode of operation spasmodic flow of powder in the discharge conduit 16 is obviated.

A loss of air pressure may occur in some cases in that portion of the discharge conduit 16 beyond the nozzle 68. It may be necessary or desirable to boost the powder from the conduit 16 into the rubber extruding machine. To this end the discharge conduit 16, near the extruding machine, may be provided with a nozzle (not shown) into and out of which the powder flows. This nozzle may be provided with an internal air passage supplied with air under pressure from the main air line by a flexible hose which preferably is connected to the high pressure side of the oil and water separator mentioned above, such as the type disclosed in my pending application filed July 12, 1929, Serial No. 377,668.

In order to vary the amount of atomized powder expelled from the space 240 by the air under pressure therein the pipe 60 may be rotated angularly through an arc of 180 degrees. When the intake 58 is positioned as shown in Fig. 5 the maximum amount of powder is expelled from the space 240 through the pipe 60. When the intake 58 is turned through an arc of 180 degrees it cannot receive directly from the discharge orifice in the elbow 56 any atomized powder. In such a position of the intake 58 only powder floating in the space 240 may be expelled therethrough. The pipe 60 may be conveniently rotated through manipulation of the nozzle 68. When the nozzle 68 is manipulated to turn the pipe 60 through an angle of 180 degrees the intake 58 is directed away from the orifice in the elbow 56, and consequently the minimum flow of powder into the extruding machine is obtained.

Turning the nozzle 68 slightly in a counter-clock-wise direction, viewing Fig. 2, causes the pipe 60 to turn through a small arc. The intake 58 is sensitive to changes in its position relative to the discharge orifice in the elbow 56 as a slight turn of the nozzle 68 in the manner described produces a big change in the volume of powder delivered to the extruding machine. As shown in Fig. 2 the top of the cover 24 is provided with lines indicating the position the nozzle 68 should point in order to obtain maximum, minimum and intermediate volumes of powder discharge from the chamber 23.

Referring to Fig. 1 experience has demonstrated that as the jet of air continues to withdraw material from a deep part of the body portion thereof and to drive it into the intake 22 a condition of unbalanced pressure is created on a slender core of material extending from the gap 31 to the surface of the material. Air under pressure in the space 240 tends constantly to feed this core of material downwardly into the gap. When this core of material is exhausted a hole is formed extending from the gap 31 to the space 240 resulting in stopping the flow of powder into the intake 22. In order to prevent the hole referred to from being formed and to maintain the gap 31 buried with powder until the material in the chamber is almost exhausted, the hangers 560 each support a bearing 77 for a vertical shaft 78. On its lower end the shaft 78 is provided with a paddle 79 (Fig. 1) arranged to sweep over the gap 31 and maintain it buried with powder. Stated in another way, the circle generated by one extreme edge of the paddle cuts the vertical plane intersecting the longitudinal axes of the nozzle 30 and intake 22. In effect, the paddle breaks down powder outside the area of the core hereinbefore referred to and feeds it into the core to maintain its bottom intact and the gap 31 supplied with powder. The shaft 78 is rotated by an air motor 80 secured to a vertical plate 81 carried by the cover 24. The motor 80 is supplied with air through a flexible hose 82 which is connected through a stop-cock with the main air line.

As shown in Figs. 1 and 2 the branch air conduit 43 and the pipe 70 are provided with gages 84 and 85, respectively, so that the operative may observe and compare the pressure of the air to be delivered through the pipe 36 to the nozzle 30, and the pressure of the air in the space 240. The greater the difference is between these two pressures the higher is the velocity of the air-jet issuing from the nozzle 30 and the greater is the amount of powder driven into the discharge conduit 16 through the intake 22. By manipulation of the pressure reducing valve 51 the difference in the two pressures hereinbefore referred to may be decreased as desired to control the volume of powder circulated from a deep part of the body portion thereof to the space 240.

To operate the fluid current conveyor the chamber 23 is filled partially with powder to leave a space 240 between it and the cover 24 when the cover is clamped into position over the open top of the chamber. The pressure reducing valve 51 is adjusted to deliver air under pressure to the nozzle 30. The amount of pressure of the air delivered by the pressure reducing valve 51 depends upon the material to be conveyed and the use to which the conveyed material is to be put. The pressure reducing valve 53 is adjusted to deliver air under pressure to the space 240. The amount of pressure delivered by the pressure reducing valve 53 depends upon the maximum pressure in the space 240 necessary or desirable to transfer the material from said space out of the chamber 23. That is, the initial operating air is delivered to the chamber 23 through the pipes 36 and 52. When the pressure of the air in the space 240 reaches the pressure to which the reducing valve 53 is set the valve 53 automatically closes and shuts off further delivery of air to the space 240 through the pipe 52. By-passing air to the space 240 through the pipe 52 and pressure reducing-valve 53 is a temporary expedient effective merely in building up the operating pressure in the space 240 to cause the fluid current conveyer to start quickly when placed in operation initially, or after the conveyer has been shut down for a period, or after the chamber 23 has been replenished with powder.

After adjustment of the pressure reducing valves 51 and 53 the stop-cock 49 is opened to permit air delivered from the main air line to flow through the branch air conduit 43. At the same time the air motor 80 is supplied with air under high pressure from the main line. This air operates the motor 80 to rotate the paddle 79 and sweep powder over the gap 31 to provide the nozzle 30 with a constant supply of powder. The air issuing from the nozzle 30 has an inspirating action causing the powder to be driven into the intake 22 in great volume. As the pressure within the chamber 23 and the pipe 55 is balanced and as the pressure of air in the pipe 36 is much more than the balanced pressure, the air-jet issues from the nozzle 30 with a high velocity. The commingled powder and air which enters the intake 22 flows up through the pipe 55 from which the atomized powder is discharged laterally in a wide fan formation into the space 240. Most of the powder discharged from the pipe 55 settles and returns by gravity to the surface of the powder, but a small quantity collects in the intake 58 of the pipe 60. This powder collected in the intake is blown upwardly in the pipe 60 by the air under pressure in the space 240. The amount of powder collected by the intake 58 may be varied by turning the pipe 60 to face the intake more or less away from the orifice in the elbow 56 through which powder from the pipe 55 is discharged. In the meantime, air from the space 240 passes out through the vent 69 from which it may be conducted to the nozzle 68 where it boosts the powder from the pipe 60 along the flexible discharge conduit 16. The powder in the discharge conduit 16 may be given another boost by air, carried from the main air line to the conduit by means of a flexible hose. It must be understood, however, that in the normal operation of the illustrated embodiment of the present invention it is not necessary to employ this second boosting by air from the main air line. This boosting air is of advantage only when a tube of unusually large diameter is to be extruded.

By the use of the illustrated embodiment of the present invention, powder is wafted through the orifices in the mandrel of the extruding machine with a force sufficient to coat the interior of a tube, but without enough air to blow up the tube either at points adjacent the mandrel or adjacent the cutting-off station at which the continuous tube is cut up into individual lengths. Thus, development of abnormalities in the tube is obviated. Furthermore, all the powder introduced into the tube is utilized to coat the interior thereof, there being not enough air within the tube to blow powder out the cut end thereof to waste powder and foul the atmosphere.

Moreover, through the various adjustments described the wafting of the powder through the orifices of the mandrel may be controlled to insure the coating of the tube interiors varying widely in diameter.

With the illustrated embodiment of the present invention there is no need to control with any degree of accuracy the amount of powder driven into the intake 22. Provision is made for causing a large amount of powder to enter the discharge conduit through the intake 22, but most of this powder is returned to the body portion of the powder in the chamber. Provision is, however, made through a device susceptible of extremely delicate adjustment for withdrawing from the space 240 the exact amount of atomized powder necessary to coat the extruded tube in an efficient and economical manner. The volume of air discharged through the orifices of the mandrel is sufficient to carry the powder commingled therewith to the sticky internal surface of the extruded tube. Having brought the powder into the tube to coat the sticky internal surface thereof the air is spent and cannot cause trouble during the conveyance of the extruded tube away from the extruding machine or at the cutting-off station.

Nothing herein explained is to be interpreted as limiting the various features of the present invention in the scope of its application to use in connection with the particular apparatus or the particular mode of operation or both selected for purposes of illustration and explanation. While the particulars of construction herein set forth are well suited to one mechanical form of the invention and to the use to which it is put, it is not limited to this use, nor to these details of construction, nor to the conjoint use of all its features, nor is it to be understood that these particulars are essential since they may be modified within the skill of the artisan without departing from the true scope of the actual invention, characterizing features of which are set forth in the following claims by the intentional use of generic terms and expressions inclusive of various modifications.

What is claimed as new, is:

1. In a fluid current conveyer, the combination with a pressure chamber which is partially filled with material to leave a space above it, a discharge conduit having a balanced pressure portion within said chamber and provided with an intake located in a deep part of the body portion of the material and extending therefrom to said space and an unbalanced pressure portion spaced from said first portion extending from within said space to a point of use outside the chamber, and fluid current means for causing material to enter the intake and for placing the chamber under pressure, of a vent for the chamber communicating exteriorly thereof with the unbalanced pressure portion of the conduit.

2. In a fluid current conveyer, the combination with a pressure chamber which is partially filled with material to leave a space above it, fluid current means for withdrawing material from a deep part of the body portion thereof and discharging it into said space, and angularly movable means for collecting a portion of the material discharged into the space, of means for conducting the collected material outside the chamber.

3. In a fluid current conveyer, the combination with a pressure chamber which is partially filled with material to leave a space above it, a discharge conduit having a balanced pressure portion within said chamber and provided with an intake located in a deep part of the body portion of the material and an outlet extending laterally into said space, said conduit having an unbalanced pressure portion spaced from said first portion provided with an outlet located outside the chamber and an intake located within said space and adapted to be differentially directed towards the outlet on the balanced pressure portion of the conduit, of fluid current means for causing the material to enter the intake of the balanced pressure portion of the conduit, and for entraining the material therethrough and out the outlet thereof to return some of the material to the body portion thereof by way of said space and to deposit some of the material in the intake of the unbalanced pressure portion of the conduit.

4. In a fluid current conveyer, the combination with a pressure chamber which is partially filled with material to leave a space above it, a discharge conduit having a balanced pressure portion provided with an intake located in a deep part of the body portion of the material and an outlet extending laterally into said space, said conduit having an unbalanced pressure portion provided with an outlet located outside the chamber and an intake located within said space directed towards the outlet on the balanced pressure portion of the conduit, and fluid current means for causing the material to enter the intake of the balanced pressure portion of the conduit, and for entraining the material therethrough and out the outlet thereof to return some of the material to the body portion thereof by way of said space and to deposit some of the material in the intake of the unbalanced pressure portion of the conduit, of means for angularly moving the intake of the unbalanced pressure portion bodily to vary the relative quantities of material returned to the body portion thereof and deposited in the intake of the unbalanced pressure portion of the conduit.

5. In a fluid current conveyer, the combination with a pressure chamber which is partially filled with material to leave a space above it, a discharge conduit having a fixed balanced pressure portion provided with an intake located in a deep part of the body portion of the material and an outlet extending laterally into said space, said conduit having an angularly adjustable unbalanced pressure portion provided with an outlet located outside the chamber and an intake located within said space and adapted to be directed towards the outlet on the balanced pressure portion of the conduit, of fluid current means for causing the material to enter the intake of the balanced pressure portion of the conduit, and for entraining the material therethrough and out the outlet thereof to return some of the material to the body portion thereof by way of said space and to deposit some of the material in the intake of the unbalanced pressure portion of the conduit.

6. In a fluid current conveyer, the combination with a pressure chamber which is partially filled with material to leave a space above it, a conduit within said chamber provided with an intake end located in a deep part of the body of the material and with an outlet located in said space, a second conduit spaced from the first named conduit and extending from within said space to a point of use outside the chamber, and fluid current means for causing material to enter said intake end and for putting the chamber under pressure, of spaced members carried by said fluid current means and by said intake end, respectively, in said deep part of the body of the material, one of said members being movable with respect to the other to vary the amount of material entering said intake end.

7. In a fluid current conveyer, the combination with a pressure chamber which is partially filled with material to leave a space above it, a conduit within said chamber provided with an intake located in a deep part of the body of the material and with an outlet located in said space, a second conduit spaced from the first named conduit and extending from within said space to a point of use outside the chamber, fluid current means for causing material to enter said intake and for putting the chamber under pressure, and a movable member carried by said fluid current means and adapted to be differentially spaced from said intake to vary the amount of material entering said intake, of movable means for providing a constant supply of material between said member and said intake.

8. In a fluid current conveyer, the combination with a pressure chamber in which material is placed, a conduit having one portion located wholly within said chamber and a second portion spaced from said first portion and extending from within said chamber to a point of use outside the chamber, and fluid current means for causing material to be conveyed through said portions, of means for controlling roughly the volume of material conveyed through said first named portion and means for controlling sensitively the volume of material conveyed through said second portion.

9. In a fluid current conveyer, the combination with a pressure chamber which is partially filled with material to leave a space above it, and a discharge conduit having one portion provided with an intake located in a deep part of the body of the material and with an outlet located in said space and directed substantially horizontally of the chamber, said discharge conduit having a second portion spaced from said first named portion and provided with a movable inlet located in said space and directed substantially horizontally of the chamber and with an outlet located at a point of use outside the chamber, of fluid current means for causing material to enter said intake and for putting the chamber under pressure.

WAYNE B. THOMPSON.